Nov. 28, 1967    D. WILLISON ET AL    3,354,836
ARTICULATED RAILWAY VEHICLE
Filed Oct. 22, 1965    3 Sheets-Sheet 3

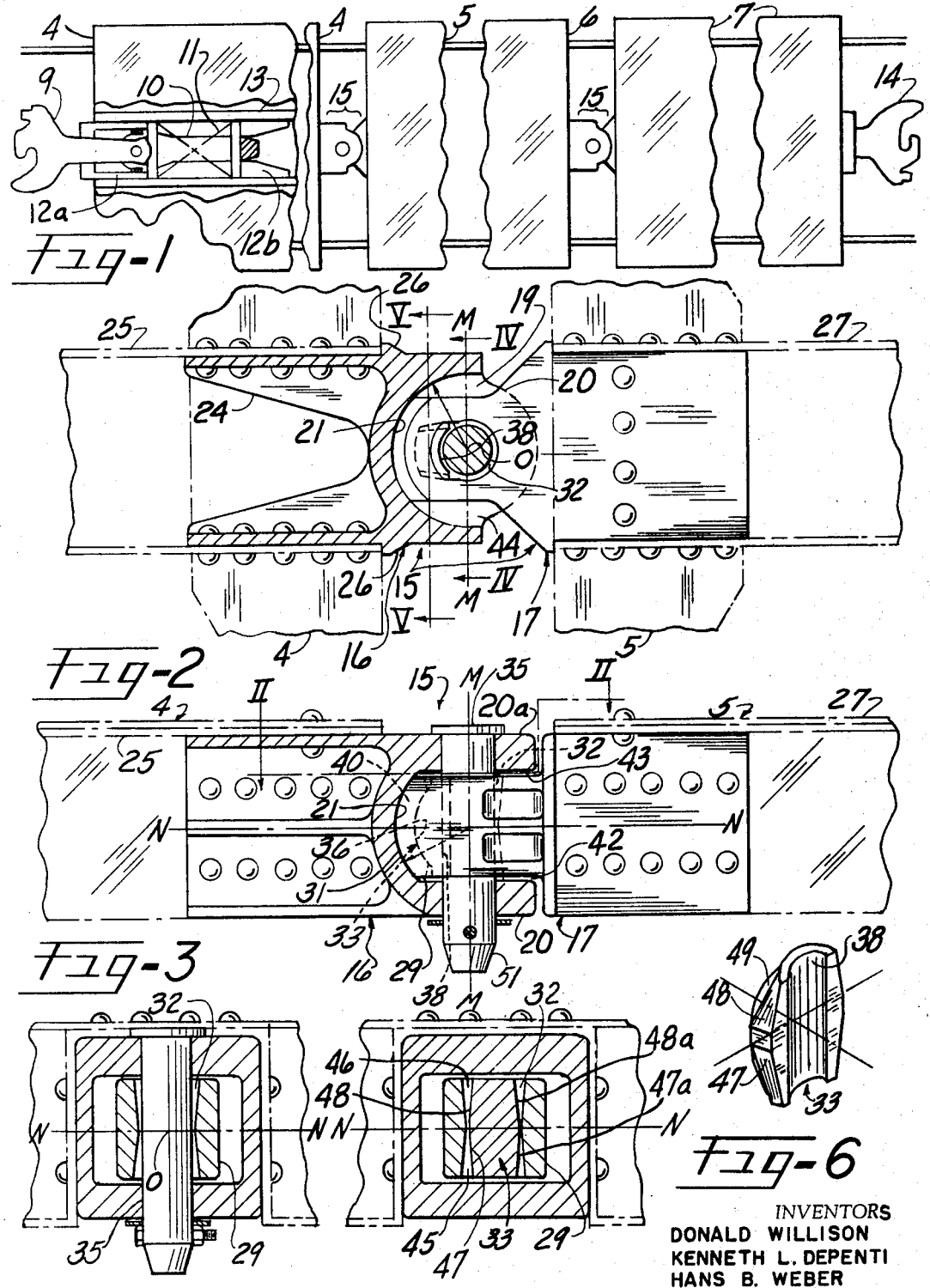

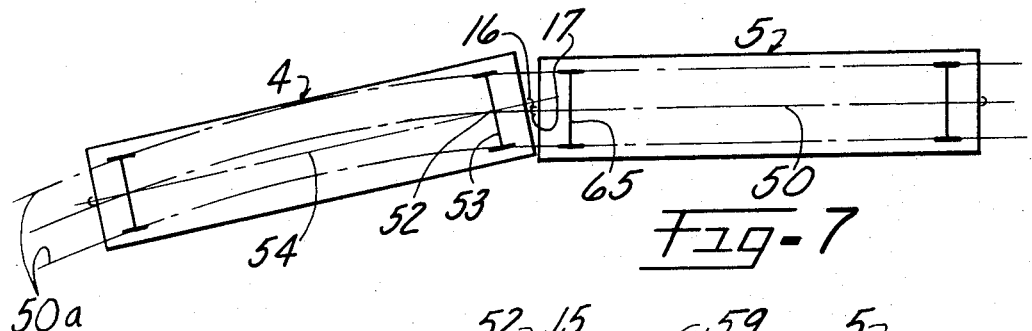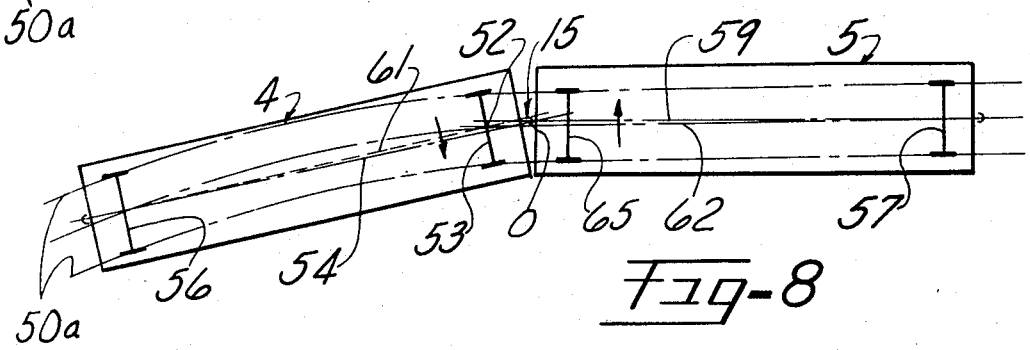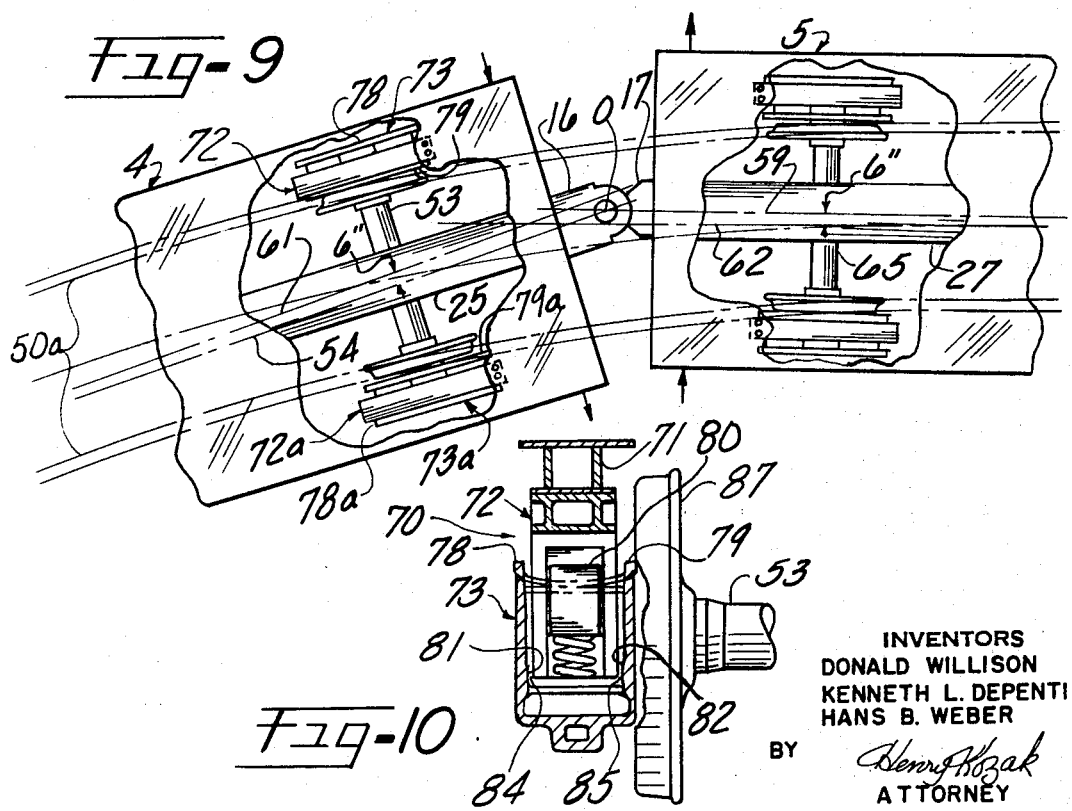

BC = relative shift of truck components necessary for coupling $$BC = \frac{AB \times WB}{4R} \times \frac{WB}{WB + AB}$$

$BX = 2\,BC$ $$BX = \frac{AB \times WB}{2R} \times \frac{WB}{WB \times AB}$$

R OR RADIUS OF TRACK CURVATURE

INVENTORS
DONALD WILLISON
KENNETH L. DEPENTI
HANS B. WEBER
BY *Henry Kozak*
ATTORNEY

United States Patent Office 3,354,836
Patented Nov. 28, 1967

3,354,836
ARTICULATED RAILWAY VEHICLE
Donald Willison, Lyndhurst, Kenneth L. De Penti, Mayfield Heights, and Hans B. Weber, Bedford, Ohio, assignors to Midland-Ross Corporation, Cleveland, Ohio, a corporation of Ohio
Filed Oct. 22, 1965, Ser. No. 501,034
10 Claims. (Cl. 105—3)

ABSTRACT OF THE DISCLOSURE

Undercar and coupling structure of railway vehicle for connecting two vehicles at a pivotal point therebetween in fixed relation with the bodies of both cars. The undercar construction enables the body of each vehicle to shift in a lateral direction relative to the wheels and the track over which connected ends of the vehicles are disposed when traversing a curved track section which tends to effect lateral separation of joined coupling structure at the pivotal point.

---

This invention relates to railway vehicles of the so-called articulated types wherein the vehicle is divided into semi-permanently series-connected sections or units which may angle relatively to each other as they pass over a track. The term semi-permanent is used in the sense that the various sections or units of the vehicle are united by non-automatic couplings and the sections remain in their connected relationship without disturbance until necessity arises to remove or replace one or more sections for repairing or other purposes. The vehicle in its entirety, on the other hand, may be used for a considerable period which it is frequently cut into and out of trains in the manner of conventional non-articulated vehicles without any effect on the physical integrity of the vehicle.

At the present stage of railway technology, it appears possible to reduce the weight of the railway equipment necessary to haul a given load by departing from the traditional railway vehicle wherein the car body is supported on two four-axle trucks and, instead, to utilize smaller wheel base four-wheel two-axle cars or units united in a multi-section vehicle. Other advantages thought to be possible are lower maintenance and operating costs, better riding performance, and quicker return on investment because of higher pay load to gross weight or tare weight ratios. These advantages are believed to be possible of achievement particularly in the transportation of bulk commodities with respect to which the length of the car is of no consequence. However, no completely satisfactory articulated vehicle concept is available from the prior art which will yield to the car builder a design which performs satisfactory under the heavy loading and high-speed conditions entailed in operation on United States railways. The solution of the problem of avoiding derailment is a primary concern. This involves such characteristics as satisfactory riding, snubbing and controlling of the oscillatory lateral and vertical movements of the car body, and ability to negotiate curves.

A primary object of the invention is to provide a railway vehicle consisting of a plurality of cars connected together semi-permanently in an arrangement which provides maximum stability of the unit in respect to derailing tendencies.

Another object is to provide a multiple-car unit which will satisfactorily utilize single axle car trucks under the cars, i.e., four-wheel cars, which may be connected so closely together as to be separated only to the extent necessary to negotiate track curvature of a standard minimum radius adopted, e.g., by the Association of American Railroads.

It is a further object to provide a multiple-car vehicle in which adjacent cars have relative universal movement with respect to a pivotal joint, the center of which is in fixed relation with both cars so that there is no relative movement between adjacent cars other than pivotal.

A further object is to provide articulated car structure which will successfully negotiate curves of the aforementioned radius of curvature under the stringent conditions imposed by a curve-and-tangent track section and the still more stringent S-type curve track section of which each portion comprises a curve of the aforementioned minimum radius curvature.

To achieve these and such other objectives as become apparent below, an articulated railway vehicle is provided in which each pair of cars in a series of semi-permanently connected railway cars is connected by a coupling comprising universally pivotally connected coupling elements arranged so that they pivot with respect to each other in radially fixed relation with respect to a center of relative pivotal movement. That is to say, relative movements between adjacent cars are restricted to strictly angling or twisting movements. The structural combination in which the invention resides further includes a car truck mechanism under the end portion of each car adjacent a coupling which has as necessary components, (1) one truck car member attached to the car body or car frame in substantially immovable relationship in respect to the horizontal transverse direction of the associated car, and (2) a track-following truck portion which includes a wheel assembly adapted to maintain tracking and rolling relation with a track, and a second car truck member to which the wheel assembly is rotatably attached in journal-bearing relationship. The car truck mechanism necessarily includes resilient means, such as springs, disposed between the two members for transmitting car loads from the first car truck member to the second.

A salient feature of the car truck mechanism is the cooperating structure of the truck members which permits relative freedom of movement of each car end portion in the transverse direction of the track to overcome the difference in distance from the track center which the coupling elements assume when respective cars stand uncoupled on a curve-and-tangent or S-curve track section. The truck components are accordingly relatively yieldable to enable the coupling elements to join at a neutral point of connection through warping within the two truck mechanisms of the adjacent car portions involved.

A pair of adjacent cars positioned on a curve and tangent section or an S-track section may be assumed to have their coupling elements connect with each other at a point along the track containing the above mentioned pivotal center which is at maximum deviation for such section from the track center line. If the cars are disconnected without any movement lengthwise of the track, the cars assume free positions which displace the elements to opposite sides of the previous point of connection. Warping of both adjacent cars in their entireties is required to shift the coupling elements back to the point of connection.

In the drawing with respect to its invention as described below:

FIG. 1 is a longitudinally shortened schematic plan view of at least four cars connected together as an articulated vehicle;

FIG. 2 is a fragmentary plan view partly in section of a car-to-car coupling for connecting the end portions of cars interiorly of the series shown in FIG. 1 as taken along line II—II of FIG. 3;

FIG. 3 is a fragmentary side elevation of the coupling of FIG. 2 with one of the elements thereof sectioned along a longitudinal central vertical plane;

FIG. 4 is an elevation in cross section taken along line

Figure 12:
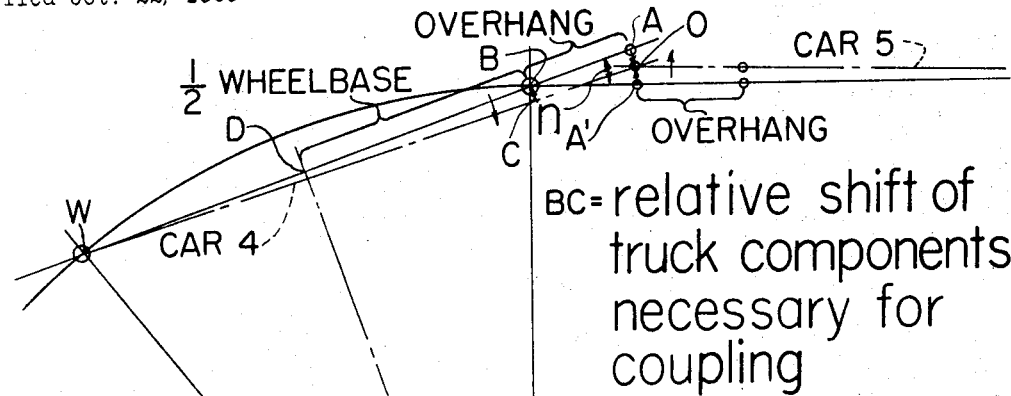
Figure 13:
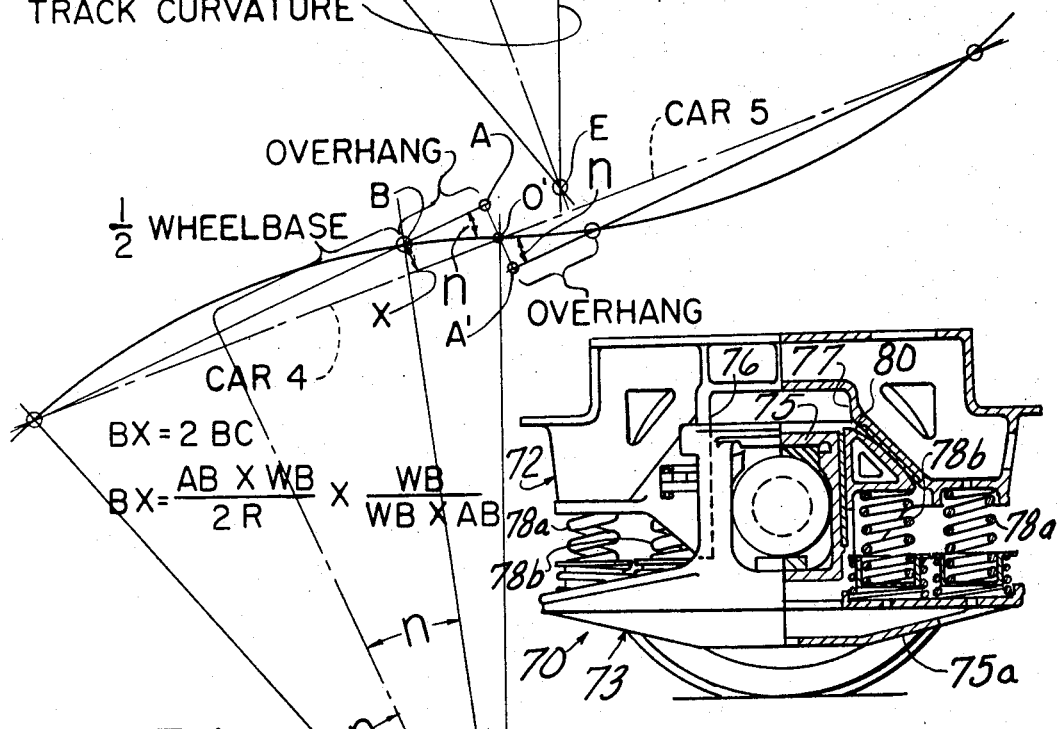
Figure 11:
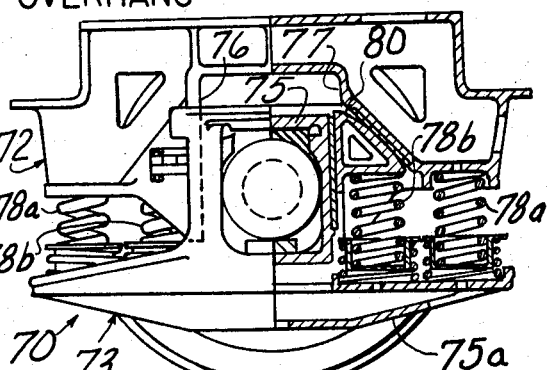

IV—IV of FIG. 2 also identified as a transverse plane M—M;

FIG. 5 is an elevation in cross section taken along line V—V in FIG. 2;

FIG. 6 is a perspective view of a bearing block shown in FIGS. 2, 3, and 5;

FIG. 7 is a schematic plan view of two uncoupled cars on a curve-and-tangent track section;

FIG. 8 is a schematic plan view of the cars shown in FIG. 7 without change of wheel position but in coupled position;

FIG. 9 is an enlarged schematic view showing in greater detail portions of the cars of FIG. 8 adjacent the coupling thereof illustrating the relative lateral movement of car components within each car to maintain coupled relationship;

FIG. 10 is an end elevation with parts in section of the car truck illustrated in FIG. 11;

FIG. 11 is a side elevation of the car truck of FIG. 10 with a portion thereof shown in longitudinal section;

FIG. 12 is a geometric diagram representing the center line of a curve-and-tangent track section, the radius of the curve in such section, and car body axes of adjacent cars before and after coupling, and the formula derived from the geometric relationships in this diagram for computing the extent of transverse shifting of truck components in attaining coupled condition from uncoupled condition; and FIG. 13 is geometric diagram of the track center line of an S curve, disposition of car body axes before and after coupling from positions of maximum deviation of their coupling elements from the track center line, the radius of curvature for each portion of the curve, and the formula which expresses the amount of adjustment of the car body axes necessary to attain coupled relationship from uncoupled relationship.

In FIG. 1 are seen portions of cars 4, 5, 6, and 7 which comprise an articulated vehicle. The end cars 4 and 7 of the series each include conventional draft rigging on the portions thereof facing outwardly of the ends of the series. As shown with respect to car 4, the draft rigging comprises an automatic knuckle type coupler 9 pinned to a yoke 10 which surrounds a draft gear 11 housed in the draft gear pocket defined by front stops 12a and rear stops 12b attached to a center sill 13. Car 7 includes a similar draft rigging comprising the coupler 14. Internally of the series, each pair of adjacent car ends is connected by a coupling 15 comprising a female coupling element 16 connected with the center sill of one car, and a male element 17 connected with the center sill of the adjacent car.

It is a feature of this invention that the coupling elements 16 and 17 comprise cooperating pivotal structure which connects them at a pivotal center for relative pivotal or twisting movements of the car body and frame assemblies of respective cars. That is to say, the coupling, while free to angle, is non-resilient with respect to any relative movement of the elements in the lengthwise direction of the track or in any place extending transversely of the track through the pivotal center of the coupling.

The coupling element 16 is recessed horizontally inwardly from its outward end with the bottom and top of the recess 19 being defined by a pair of vertically spaced eye portions 20 and 20a, respectively. The recess is further defined by a concave partially spherical surface 21 extending between the eye portions. Each eye portion is in coaxial relationship with each other along an axis contained in the plane MM. The center for the spherical radius of the surface 21 is located approximately midway along the axis MM the eye portion. As FIGS. 2 and 3 show, the element 16 has a rearward portion 24 which extends interiorly of the associated car center sill 25 in telescoping relation therewith and is secured thereto by the rivets shown. Abutment lugs 26 engage the end surface of the sill to properly register the element 16 with the sill.

The male coupling element 17 projects as shown into the recess 19 of the element 16.

The male coupling portion 17 has a portion in telescopic relation with the center sill 27 of the car 5 adapting it for attachment thereto in the same manner as the element 16. The element 17 projects forwardly with respect to its parent car 5 as a boss 29 which in turn extends into the recess 19 of the element 16. The boss 29 has a spherical end surface 31 of curvature matching that of surface 21 of the element 16. It also has an opening 32 of irregular shape adapting the boss 29 for receiving a bearing block 33 and a pin 35.

The bearing block 33 is provided in a manner known to the railway coupler art as a means for sustaining the wear which would otherwise be taken by the pin, and also to permit the pin to undergo universal action relative to the boss 29. The opening 32 of the boss has a main cylindrical portion for accommodating the pin 35 and extends forwardly within the boss to form a recess which accommodates the bearing block 33. This recess is defined partially by a concave spherical surface 36 interiorly of the boss which is concentric to the outer spherical convex surface of 31 of the boss and outer spherical concave surface 21 of the element 16. These various spherical surfaces have their radii of curvatures centered at the intersection O of the axis of the pin 35 and a horizontal vertically-central longitudinal plane NN. Point O is also the pivotal center for the coupling elements 16 and 17 as well as the pivotal center for the car bodies and frames associated with these elements. As both elements are constructed with surfaces which are concentric with the point O, when disconnected from each other they may be regarded as having geometric junction points with respect to which respective spherical surfaces are concentric but such junction points merge in the pivotal center of connection O when the two coupling elements are connected into a single coupling.

FIGS. 2 and 3 show the bearing block 33 in an operative position such as assumed when one car is pulling the other. As the bearing block has a concave cylindrical surface 38 which mates with the outer cylindrical surface of the pin 35, the pin, the bores of the eye portions of the elements 16, and the cylindrical surface 38 of the bearing block are all in approximate relation with the pin axis contained by the plan MM.

As a special feature of this invention, the bearing block 33 and the recess therefor are especially contoured to permit a small amount of universal action or angling freedom of the element 17 with respect to the element 16. During any relative angling movements, except those involving substantial rotative movements of the element 17 about the pin, the pin may be viewed as retaining a nearly fixed position of the pin with the end wall 40 of the boss sliding concentrically over the bearing block 33. FIGS. 1 and 2 make it obvious that the boss 29 is proportioned to smaller dimensions than the recess 19 in the vertical and horizontal directions; e.g., note the clearance at 42, 43, and 44, which allow limited angling movements of the coupling elements and respective car bodies in any possible direction with respect to the point O.

To facilitate such angling freedom, the opening 32 as measured along the vertical transverse plane MM, as shown in FIG. 4, is of slightly hourglass shape wherein the minimum transverse dimension of the opening 32 is approximately along the plane NN and merely sufficient to accommodate the periphery of the pin 35. The opening 32 diverges upward and downward from the plane NN to provide freedom for twisting movement of the boss 29 within the recess 19 and, hence, the twisting movement of one car relative to the other in cooperation with the construction shown in FIG. 5.

The latter figure depicts a transverse cross section toward the forward extremity of the boss 29 and through a portion of the bearing block 33. It is evident that the rearward recessed portion of the opening 32 is of hour glass shape and the bearing block is of barrel shape in transverse cross section to provide clearances, e.g., at 45 and 46, which become progressively wider as they extend away from the vertical central horizontal plane NN. Obviously, the bearing block, contoured with outer flat surfaces 47, 48, 47a, 48a, and spherical surface 49, may twist within the recess portion of the opening 32 as one car body rotates about its longitudinal axis with respect to the car body of the adjacent car.

Although the prior art discloses arrangements for maintaining the bearing block in position in order to facilitate insertion of the pin through the elements 16 and 17, the arrangement shown discloses no special facility for prepositioning the bearing block. Instead, the pin is provided with a tapered end portion 51 which easily enters the upper bore of the element 16 and the generally cylindrical cavity defined by the bearing block and the portion of the opening 32 in concentric relation with its cylindrical surface 38. During entry of the pin approximate positioning of the bearing block is attained by insertion of a bar or other tool through the lower bore of the element 16.

Passing now to a consideration of the cars in their entirety, FIGS. 7 and 8 schematically illustrate a pair of adjacent cars situated on a curve-and-tangent track section at that point at which, if the cars are uncoupled from other cars and otherwise free of external transverse forces, their coupling elements will assume maximum transverse offset relation with each other. This condition is obtained on a curve-and-tangent track section, when one car stands on the tangent section and the other car stands on the curved section with its truck nearer the car on the tangent section at the junction, i.e., point 52, of the curve-and-tangent track portions. An all important aspect of coupling two cars under this situation is the amount of "overhang" of the junction point or center in the coupling element with respect to the axle axis of the nearer car truck with the parent car, i.e., the extent to which the coupling element projects beyond a vertical plane containing the wheel axis of the adjacent car truck of the same car.

Observing now the cars as shown in FIG. 7 and the relationship of the coupling elements 16 and 17 of the uncoupled cars, element 17 directly overhangs the center line 50 of the track 50a. That is to say, the longitudinal axis of the car body of car 5 is parellel and directly over a rectilinear section of the track center line. Since the track does not begin to curve, proceeding right to left along the center line, until the center line of the track passes under point 52, the point at which a wheel assembly 53 of car 4 intersects the center line as well as the car body axis 54.

From FIG. 7 it is apparent that both cars must be warped each in its entirety to somehow effect coupling of the cars, i.e., to bring the junction points of the elements 16 and 17 into mergence as a pivotal point of connection.

FIG. 8 shows the elements 16 and 17 connected as coupling 15. In affecting such connection, the end portions of the car bodies adjacent the coupling 15 have been swung transversely approximately about the remote wheel assemblies 56 and 57 as pivotal centers until the longitudinal axes 54 and 59 of respective car bodies meet in the pivotal center of connection (described as point O with respect to FIGS. 2 and 3). The magnitude of warping of the cars is indicated, e.g., by the angle between body axis 54 and an axis 61 with respect of which the wheel assemblies 53 and 56 remain centered while the car body axis shifts with respect thereto in negotiating curves. In car 5 it may be noted that the car body axis 59 is shifted with respect to the longitudinal axis 62 of the wheel assemblies 57 and 65. Briefly speaking, it may be said that the car bodies are shifted in transverse directions with respect to respective wheel assemblies in order that their coupling elements may reach a neutral or medial point of connection.

FIG. 9 is an enlarged more detailed version of adjacent portions of cars 4 and 5 as shown in FIG. 8. The purpose of FIG. 9 is to bring out in a simplified manner the shifts that take place between components of the car truck in order to achieve such shifting of the car bodies relative to the wheel assemblies 53 and 65 as to maintain the connection of the cars without derailment in negotiating a curve-and-tangent track section. FIG. 9 is better understood with reference to FIGS. 10 and 11 which depict a type of car truck mechanism by which the present invention has been reduced to practice.

FIGS. 10 and 11 illustrate truck mechanism at one side of the car but duplicated at both sides of the car in combination with a single wheel assembly of the truck. As shown in FIGS. 10 and 11, one of the axle journals of each wheel assembly (wheel assembly 53 shown by way of example) is received in a car truck portion 70 attached to a side sill 71 of a car frame. The truck portion comprises a pedestal frame 72 affixed to the car frame, and a journal saddle 73 resiliently connected with the pedestal frame to permit resilient vertical and lateral tilting movements relative to the pedestal frame. A car truck of this type is disclosed in Application Serial No. 458,005, filed May 24, 1965. Other principal features of the truck are that the journal saddle 73 has a bearing housing 75 projecting upwardly from its base 75a between, and in guide relationship with horizontally spaced columns 76 and 77 of the pedestal frame, and sets of springs 78a and 78b resiliently separate the pedestal frame from the journal saddle. As shown, the spring groups 78b bear on friction wedges in each of the columns, e.g., wedge 80, to provide a friction mechanism for snubbing free oscillation of the car body and pedestal frames relative to the journal saddles and wheel assembly of the car truck.

The important feature of the car truck shown, or any other car truck that may be used in this invention, is that it provides adequate freedom of motion of the wheel assembly and journal saddle relative to the pedestal frame in a transverse direction to the car to enable the use of rigid projection of the car center sills, i.e., the coupling elements 16 and 17, connected at a precise pivotal center O. FIGS. 8 and 9 illustrate that the car bodies must be forced in opposite directions relative to the rails to permit connection of the coupling elements 16 and 17. FIG. 9 also illustrates shifting of the car body and the pedestal frames 72 and 72a of the car 4 relative to the wheel assembly 53 and the journal saddles 73 of the car toward the inside of the curve. Such shifting is apparent in FIG. 9 in the manner in which the pedestal frame as shifted away from flange 78 toward and against flange 79 in the portion of the truck frame along the outside of the curve on car 4. On the portion of the truck toward the inside of the curve the pedestal frame 72a is shifted away from flange 79a toward or against the flange 78a. The journal saddle 73 or 73a has the facility of being able to shift sideways until either one of fulcrum ridges 81 or 82 has moved against the pedestal frame. In either case, a clearance at 84 or 85 will be closed depending on the transverse direction of the movement of the car body. After the clearance is closed the wheel assembly may shift further in the direction which causes the closing of the gap to tilt the journal saddle until the upper portion of the adjacent journal saddle flange 78 or 79 rests against detent means, such as the side of the pedestal frame 72. For example, when the fulcrum ridge 82 engages the side of the pedestal journal 72, the car body may swing further in a transverse direction carrying the pedestal frame 72 toward the wheel 87 of the wheel assembly 53. Meanwhile, the upper portion of the journal saddle will tilt toward the left as viewed in FIG. 10 to carry the flange 79 against the pedestal frame.

The amount of clearance between the pedestal frame and the fulcrum ridges 81, 82, and for the journal saddle flanges 78 and 79 may be enlarged or diminished in accordance with the amount of deviation a car coupling pivotal center O has with the track center line. During such tilting of the journal saddles the springs 78a and 78b are bowed out of normal rectilinear shape and exert strong forces on the journal saddle to seek normal position after the curve is traversed.

The wheels of the wheel assemblies 53, 56, 57, and 65 are spaced in order to obtain a standard clearance between the flanges of the wheels and the innerside surfaces of the rails. A clearance of ¼ inch is common and is of aid in enabling the car bodies of cars negotiating the curve to be pulled transversely of the track sufficiently to accommodate the necessary deviation of the coupling center relative to track center. The wheel flange-to-rail clearance permits the truck designer to provide correspondingly less capability within the car truck for relative transverse movement of truck components in curve negotiation.

The geometry expressing some of the relationships of the cars of the articulated vehicle of this invention in relation to a track section over which they may pass are expressed in the diagrams illustrated by FIGS. 12 and 13. These diagrams are useful in the derivation of simple formulae which yield in an approximate manner the amount of car body shift relative to a free car position necessary for transversing curves when the following factors are known: (1) the wheel base of the car, (2) the amount of projection or "overhang" of the coupling element beyond the wheel base, and (3) the radius of curvature of the curved portion of the track section. Although the formulae herein offered are highly simplified to eliminate a number of small and nearly insignificant factors that would greatly complicate such computation, the formulae are considered to yield sufficient accuracy for use of the designer.

Observing now FIG. 12, the formulas offered below are based on the assumption that triangle DEB and triangle ABA$^1$ have similar angles, and certain angles of these triangles identified by small $n$ are equal. Then certain relationship can be noted between the sides of these triangles. For example, it may be seen that the distance AA$^1$ which represents the distance between the junction point of the coupling element of car 4 and the track center on which is disposed the coupling element of car 5 when the cars are uncoupled, may be expressed as one half the truck wheel base times the overhang AB divided by the radius of curvature R. It may be further observed that BC is the distance over which relative movement must take place between truck components at one extremity of the wheel base WB. It is further obvious that AO, the distance through which the junction point of the coupling element 16 moves to couple with the coupling element 17 of car 5 is proportional to BC in accordance with the proportion existing between the wheel base WB and the wheel base WB plus the overhang BA. It should be still further noted that AO is approximately one-half of AA$^1$. Hence, the formula evolves that:

BC (relative shift of truck components necessary for coupling on curve-and-tangent track section)
$$= \frac{AB \times WB}{4R} \times \frac{WB}{WB + AB}$$

Considering further the S-curve situation of FIG. 13, it is quickly apparent that if the radius of curvature R is the same as in FIG. 12 (the curve-and-tangent situation), the relative shift of truck components necessary for coupling on S-curve track section is BX. Hence, BX track components necessary for coupling on S-curve track section equals 2BC because AO$^1$ is approximately twice the length of AO. Hence:

$$BX = \frac{AB \times WB}{2R} \times \frac{WB}{WB + AB}$$

The terms and expressions which have been employed are used as terms of description and not of limitation and there is no intention of excluding such equivalents of the invention described or portions thereof as fall within the scope of the claims.

We claim:
1. In a series of semi-permanently connected railway cars adapted to traverse an S-shaped track section of known curvature, the combination comprising:
 (a) a car-to-car coupling comprising universally pivotally connected elements, each element fixed to an adjacent car and connected with each other in radially fixed relation with respect to a center of relative pivotal movement;
 (b) car truck mechanism under the end portion of each car adjacent said coupling comprising:
  (1) one car truck member attached to car body and frame structure in substantially immovable relationship in respect to the horizontal transverse direction of the respective car,
  (2) a track-following truck portion including a wheel assembly adapted to maintain tracking and rolling relation with a track, and a second car truck member attached to said assembly in journal-bearing relation therewith,
  (3) resilient means disposed between the two members for transmitting car loads from the first member to the second member, said members having relative freedom of movement in ranges corresponding to said curvature in said transverse direction to maintain said wheel assemblies in tracking relation with said track sections.

2. In a series of semi-permanently connected cars adapted to traverse an S-shaped track section of known curvature, the combination comprising:
 (a) car body and frame structure in each car;
 (b) a car-to-car coupling comprising universally pivotally connected elements, each element fixed to said structure of an adjacent car and having a junction point within its distal portion, the elements being connected with each other in radially fixed relation with respect to a pivotal center for relative pivotal movement of said structures in which respective junction points are merged, respective cars of said elements having a position along said track section at which, when each car is in uncoupled condition free of other cars, the elements assume positions of maximum transverse separation at opposite sides of said pivotal center;
 (c) car truck mechanism under the end portion of each car adjacent said coupling comprising:
  (1) one car truck member attached to said structure in substantially immovable relation therewith in the transverse direction of the car,
  (2) a track-following truck portion including a wheel-assembly adapted to maintain tracking and rolling relation with said track, and a second car truck member attached to said assembly in journal-bearing relation therewith,
  (3) resilient means disposed between and separating the two members, said members having relative freedom of movement in ranges corresponding to the movement of said elements transversely toward each other necessary for merging respective junction points in said pivotal center.

3. The combination of claim 2 wherein:
said coupling elements are male and female in relationship, and the female element has a recess extending inwardly from its distal end terminating inwardly in a partially spherical concave surface, and the male element extends into said recess and terminates at its distal end in a convex partially spherical surface in abutting relation with said concave surface and has a vertical opening extending through the center of curvature of said convex surface;

said female element has vertically spaced eye portions providing apertures in vertical alignment with said opening when positioned by respective cars in rectilineal alignment; and said pin and surfaces of the male element defining said opening are relatively contoured to enable limited universal pivoting of one element with respect to the other.

4. The combination of claim 3 wherein:

said opening includes a recess extending internally of the male element toward said convex surface and is defined in part by a partially spherical concave surface substantially concentric with said convex surface; and the coupling includes a bearing block received in said recess between the pin and said recess surface the block having a partially spherical convex surface of curvature matching and engaging said recess surface, and a partially cylindrical surface in engagement with the pin and matching the curvature thereof;

said bearing block being smaller than the recess in vertical and transverse directions of the cars to enable universal movements of the female element, the pin, and the bearing block relative to the male element in a vertical transverse plane.

5. The combination of claim 4 wherein:

to facilitate said universal movements, said opening diverges hour-glass fashion to greater horizontal width both upward and downward from an approximately vertically-medial horizontal plane of said opening in a vertical transverse plane containing the axis of said pin.

6. The combination of claim 5 wherein:

to facilitate said universal movements, said recess and said bearing block are relatively contoured in a vertical transverse plane of cross section thereof to define clearances at both sides of the bearing block which diverge upward and downward to greater width from said medial plane.

7. The combination of claim 4 wherein:

to facilitate said universal movements, said recess and said bearing block are relatively contoured in a vertical transverse plane of cross section thereof to define clearances at both sides of the bearing block which taper hour-glass fashion upward and downward from a vertically horizontal approximately medial plane of said opening.

8. The combination of claim 2 wherein:

said car truck means is a two wheel car truck and said one truck member is a pedestal frame having vertical columns and the second truck member is a journal saddle disposed underneath the frame having a journal housing thereof extending from a base thereof upwardly between said columns, and said car truck includes a friction mechanism comprising a friction wedge disposed between a column and the housing in slidable relation with one of said columns and said housing to dampen vertical and lateral movements of the members relative to each other.

9. In a series of semi-permanently connected railway cars, the combination of claim 2 included in each pair of adjacent car end portions internally of the series, said car-to-car coupling being non-yielding and rigid in the longitudinal direction of said series;

said series comprising end cars having draft rigging in the end portions of said end cars facing outwardly of the series; the draft rigging in each of said end portions comprising a car coupler and buff-and-draft cushioning means connecting the coupler with the frame of the associated end car.

10. In a series of semi-permanently connected railway cars adapted to traverse a curved track section of known curvature, the combination comprising:

(a) a car-to-car coupling comprising universally pivotally connected elements, each element fixed to an adjacent car end and connected with each other in radially fixed relation with respect to a center of relative pivotal movement;

(b) car truck means under the end portions of each car adjacent said coupling comprising (1) one car truck member attached to the car in substantially immovable relation with respect to the horizontal transverse direction of the respective car, (2) a track-following truck portion including a wheel assembly adapted to roll along a track, and a second car truck member attached to said assembly in journal-bearing relation therewith, (3) resilient means disposed between the two members for transmitting car loads from the first member to the second member, (4) detent means on said one member and said track-following truck portion spaced and arranged to provide a predetermined range of relative movement between said first member and the wheel assembly in said transverse direction required in maintaining said wheel assemblies adjacent to said coupling to remain in tracking relation with said track section.

References Cited

UNITED STATES PATENTS

| | | | |
|---|---|---|---|
| 900,759 | 10/1908 | McAdam | 105—201 |
| 1,634,398 | 7/1937 | Couch | 213—72 |
| 2,107,841 | 2/1938 | Seider | 105—175 |
| 2,115,095 | 4/1938 | Bugatti | 105—4 |
| 2,963,987 | 12/1960 | Cottrell | 105—165 |
| 3,286,653 | 11/1966 | Weber | 105—165 |

FOREIGN PATENTS 612,850   1/1961   Canada.

ARTHUR L. LA POINT, *Primary Examiner.*

J. E. BABER, *Assistant Examiner.*